Patented Oct. 26, 1943

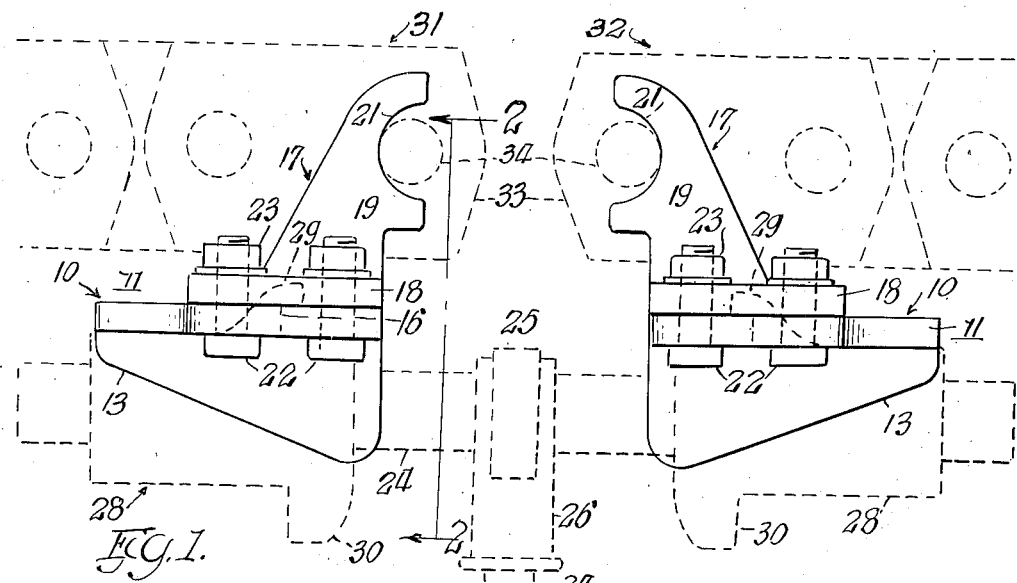
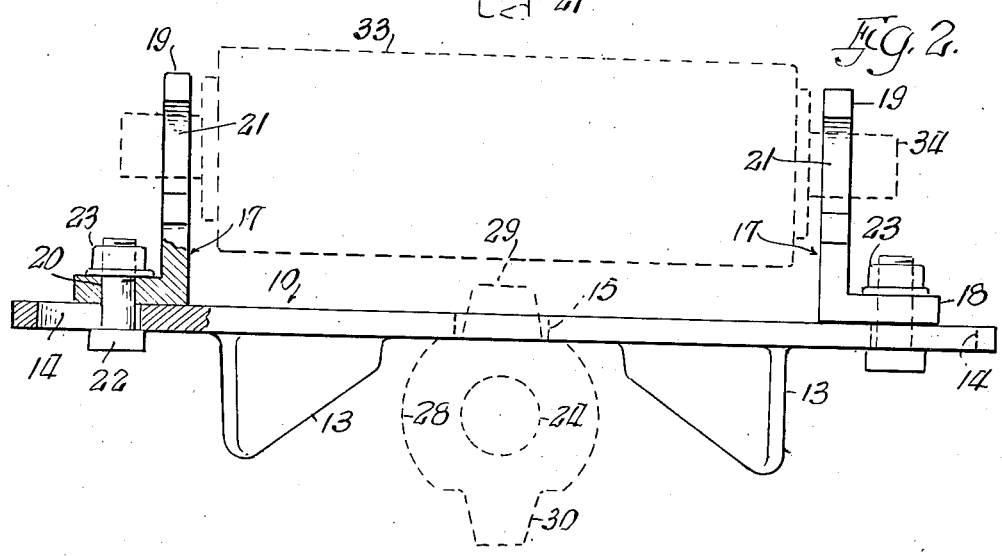
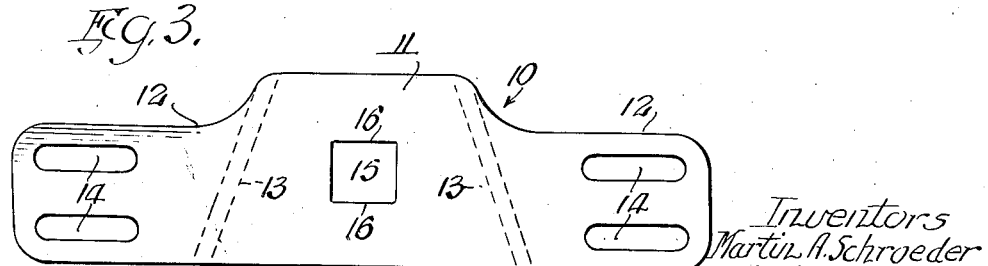

2,332,607

UNITED STATES PATENT OFFICE 2,332,607

ENDLESS TREAD TRACK TOOL

Martin A. Schroeder, Chicago, and Frank J. Jakoubek, Elmwood Park, Ill., assignors to Templeton, Kenly & Co., a corporation of Illinois Application June 3, 1942, Serial No. 445,664

7 Claims. (Cl. 254—134)

This invention relates to improvements in endless tread track tools and it consists of the matters hereinafter described and more particularly pointed out in the appended claims.

When a break occurs between adjacent links in an endless tread track, such as used in track laying tractors and the like, a difficulty arises in repairing the break by joining or connecting the ends of the track at the break, without removing the track from the associated wheels of the tractor.

One of the objects of the present invention is to provide means especially adapted for drawing and then holding the spaced ends of an endless tread track in that position permitting the placement of the pintle or pin whereby said ends are again joined together.

Another object of the invention is to provide a tool of this kind which is of simple construction, inexpensive to make, easy to operate and adjust for use with tracks of different widths.

Also, it is an object of the invention to provide a tool for this purpose which is adapted for use in connection with a conventional type of a push and pull jack.

The above mentioned objects of the invention as well as others, along with the several advantages thereof will more fully appear as the specification proceeds.

In the drawing:

Fig. 1 is a view in side elevation of a tool embodying the preferred form of the invention, when disposed in operative relation with respect to the separated ends of an endless tread track, requiring repair.

Fig. 2 is a vertical sectional view through parts shown in Fig. 1 as taken on the line 2—2 thereof.

Fig. 3 is a top plan view of one of a pair of plate-like supporting elements forming a part of the improved tool.

Referring now in detail to that embodiment of the invention illustrated in the drawing, the improved tool includes a pair of elongated counterpart plate-like supporting elements 10—10, each having a relatively wide mid portion 11 and narrower end portions 12—12, there being strengthening ribs 13—13 at the junctions of the said portions on the underside of the element. In each end portion 12 is a pair of slots 14—14 which extend parallel with the longer dimension of the plate element. In the central portion 11 of the body of the plate is a rectangular opening 15, the edges of which define spaced opposed shoulders 16—16.

Associated with each element 10 is a pair of hook-like members 17—17. Each of these members, when viewed in one direction is substantially L-shaped and includes a base portion 18 and a right angled portion 19. The base portion has holes 20—20 therein, (see Fig. 2) spaced apart the same distance as the slots 14—14 before mentioned so as to register therewith. The portion 19 is provided in one edge with a recess 21 which imparts the hook-like function to said portion 18. When the hook-like elements are disposed upon the associated supporting element, bolts 22 pass through the holes 20 and slots 14. Nuts 23 on said bolts secure the hook-like elements in place upon the associated supporting element. By loosening the nuts, it is apparent that the hook-like members may be moved toward and away from each other in the direction of the length of the slots 14 into the desired spaced apart position. By tightening the nuts 23 the hook-like elements are secured to the associated supporting element in the desired spaced apart relation.

The parts of the tool thus far described are intended and adapted for use in connection with a so-called push and pull type of jack which is available in the market. Such a jack, which is shown in dotted lines in Fig. 1, includes a shaft 24, opposite ends of which on each side of a central ratchet 25, are screw-threaded in opposite directions. A socket 26 is journalled on the mid portion of the shaft to receive an operating handle 27 and a suitable reversible pawl (not appearing in the drawing) is carried by the socket for cooperative engagement with the ratchet.

A nut 28 is engaged on each threaded end of the shaft and each nut carries upon opposite sides thereof, oppositely facing shoulders 29 and 30 respectively.

In Figs. 1 and 2 there is illustrated, in dotted lines and in somewhat of a diagrammatic fashion, spaced apart end portions 31 and 32 respectively of an endless tread track such as employed upon track laying tractors, tanks and the like. Such a track generally includes link-like treads blocks 33 pivotally connected together by pins 34, end portions of which project beyond opposite sides of the block.

In the use of the tool parts described in combination or connection with the push and pull jack mentioned, the pair of plate-like elements 10 are disposed to extend crosswise or transversely of the spaced apart link blocks, with the hook-like members 17 on each element disposed at opposite sides of each endmost block and with the recess 21 of said members on each member 10 engaged with the ends of the pins 34 as shown in Fig. 1. The jack, before mentioned, is now taken in hand and the nuts 28—28 are run up upon the associated end of the shaft 24 until the shoulders 29—29 of said nuts, facing the ratchet are so disposed as to be entered into the holes 15 of both elements 10—10 from below. By rocking the lever 27 back and forth, the nuts are caused to approach each other, the shoulders 29—29 engaging the proper shoulders 16—16 as formed by certain edges of the holes 15 in said elements.

By a further rocking movement imparted to the handle 27, the elements 10—10 are drawn toward each other the desired amount so that the pins 34 at the adjacent ends of the tread track are disposed the right distance apart. At this time the new links can be applied to the ends of said pins and these will hold the track ends together so that the tool may be removed at this time if so desired.

As the pull of the jack in this instance is imposed upon the plate-like elements 10—10 at the center thereof, the pull is equalized so that the plates cannot skew themselves.

In case a wider tread track is to be operated upon, the nuts 23 are loosened so that the hook-like members 17—17 are moved outwardly and away from each other, that distance which will accommodate the wider track. Thereafter the nuts are tightened up to securely lock the hook-like members in the adjusted position.

While in describing the invention we have referred in detail to the form and arrangement of the parts involved, the same is to be considered only in the illustrative sense so that we do not wish to be limited thereto except as may be specifically set forth in the appended claims.

We claim as our invention:

1. A tool of the kind described embodying therein two supporting elements, means providing a plurality of spaced hook-like members on each supporting element, means providing a shoulder on each supporting element between the spaced hook-like members thereon, in combination with spaced members adapted for operative engagement with the shoulder providing means on both of said elements, and means for moving said spaced members toward or away from each other.

2. A tool of the kind described embodying therein two supporting elements, a plurality of hook-like members associated with each supporting element, means for attaching each plurality of hook-like members to the associated supporting element so that said members may be moved into different spaced positions therein, means providing a shoulder on each supporting element between the hook-like members thereon, in combination with spaced members adapted for operative engagement with the shoulder providing means on both of said elements, and means for moving said spaced members toward or away from each other.

3. A tool of the kind described embodying therein two supporting elements, means providing a plurality of spaced hook-like members on each supporting element, each element having an opening therein between the hook-like members thereon and having opposite sides forming spaced shoulders for each element, in combination with spaced members, one associated with each opening and formed to engage either of the shoulders provided thereby, and means for moving said spaced members toward or away from each other.

4. A tool of the kind described embodying therein two supporting elements, means providing a plurality of hook-like members on each supporting element, each hook-like member having a flange-like part engaged with the associated supporting element, means providing a bolt and slot attachment between each supporting element and the flange like parts of the hook-like members thereon and whereby said hook-like elements may be moved into different spaced positions on the associated supporting element, means providing a shoulder on each element, between the hook-like members thereon, in combination with spaced members adapted for operative engagement with the shoulder providing means on both of said elements, and means for moving said spaced members toward or away from each other.

5. A tool of the kind described embodying therein two supporting elements, means providing a plurality of hook-like members on each supporting element, each hook-like member having a flange-like part engaged with the associated supporting element, each element having longitudinal slots therein, bolts extending through the flange-like parts of said hook-like members and through the slots in the associated elements and whereby said hook-like elements may be moved into different spaced positions on the associated supporting element, means providing a shoulder on each element between the hook-like members thereon, in combination with spaced members adapted for operative engagement with said shoulder providing means on both elements, and means for moving said spaced members toward or away from each other.

6. A tool of the kind described embodying therein two supporting elements, means providing a plurality of hook-like members on each supporting element, each hook-like member having a flange-like part engaged with the associated supporting element, and a part disposed at a right angle thereto with a recess therein defining a hook, means providing a bolt and slot attachment between each supporting element and the flange-like parts of the hook-like members therein and whereby said hook-like members may be moved into different spaced positions on the associated supporting element, means providing a shoulder on each supporting element between the hook-like members therein, in combination with spaced members adapted for operative engagement with the shoulder providing means on both elements and means for moving said spaced members toward or away from each other.

7. An assembly forming a part of a tool of the kind mentioned, the combination of a plate-like member, a plurality of spaced apart hook-like members each having a base portion disposed upon said plate-like member, means providing for a bolt and slot adjustable connection between the bases of said hook-like members and said plate-like member and whereby the hook-like members may be moved toward or away from each other into different positions on said plate-like member, and means providing a shoulder on the base-like member in a position between the hook-like members thereon.

MARTIN A. SCHROEDER.
FRANK J. JAKOUBEK.